United States Patent

Dukatz et al.

Patent Number: 5,106,158
Date of Patent: Apr. 21, 1992

[54] INTEGRAL CHILD SEAT MODULE ADJUSTABLE HEAD SUPPORT LATCH

[75] Inventors: Matthew E. Dukatz, Bloomfield Hills; Robert W. Murphy, Farmington Hills, both of Mich.

[73] Assignee: Chrysler Corporation, Highland Park, Mich.

[21] Appl. No.: 748,733

[22] Filed: Aug. 22, 1991

[51] Int. Cl.⁵ ............................................. A47C 15/00
[52] U.S. Cl. ................................... 297/396; 297/238; 297/112
[58] Field of Search ............... 297/396, 403, 408, 409, 297/410, 391, 112, 238, 191, 114

[56] References Cited

U.S. PATENT DOCUMENTS

| | | |
|---|---|---|
| 2,652,101 | 9/1953 | Samsky et al. .................. 297/403 X |
| 3,159,427 | 12/1964 | Lawson ........................... 297/112 X |
| 3,951,450 | 4/1976 | Gambotti ........................ 297/238 |
| 4,533,176 | 8/1985 | Wyttenback .................... 297/238 |
| 4,664,433 | 5/1987 | Casale ............................ 297/238 |
| 4,664,443 | 5/1987 | Casale ............................ 297/238 |
| 4,690,455 | 9/1987 | Bailey ............................. 297/238 |
| 4,854,639 | 8/1989 | Burleigh et al. ................ 297/250 |

Primary Examiner—Laurie K. Cranmer
Attorney, Agent, or Firm—Edward P. Barthel

[57] ABSTRACT

There is disclosed herein a child seat module integrally mounted in an automotive bench seat, and including a latch arrangement for rapidly and easily raising and lowering a fold-up head support, along with adjusting the height thereof. The latch arrangement includes features for assuring that the head support is rigidly retained in its respective child and adult use positions.

7 Claims, 2 Drawing Sheets

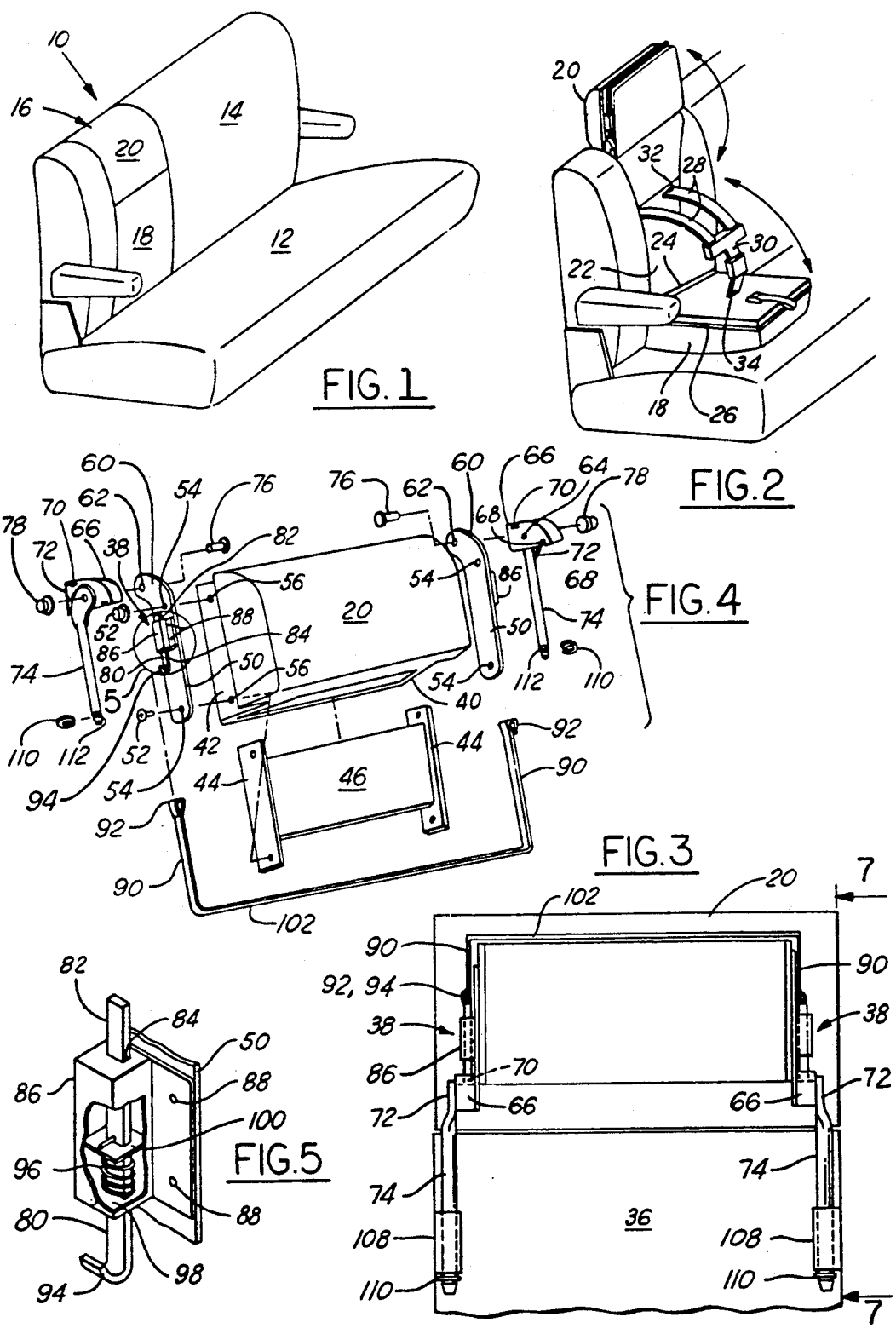

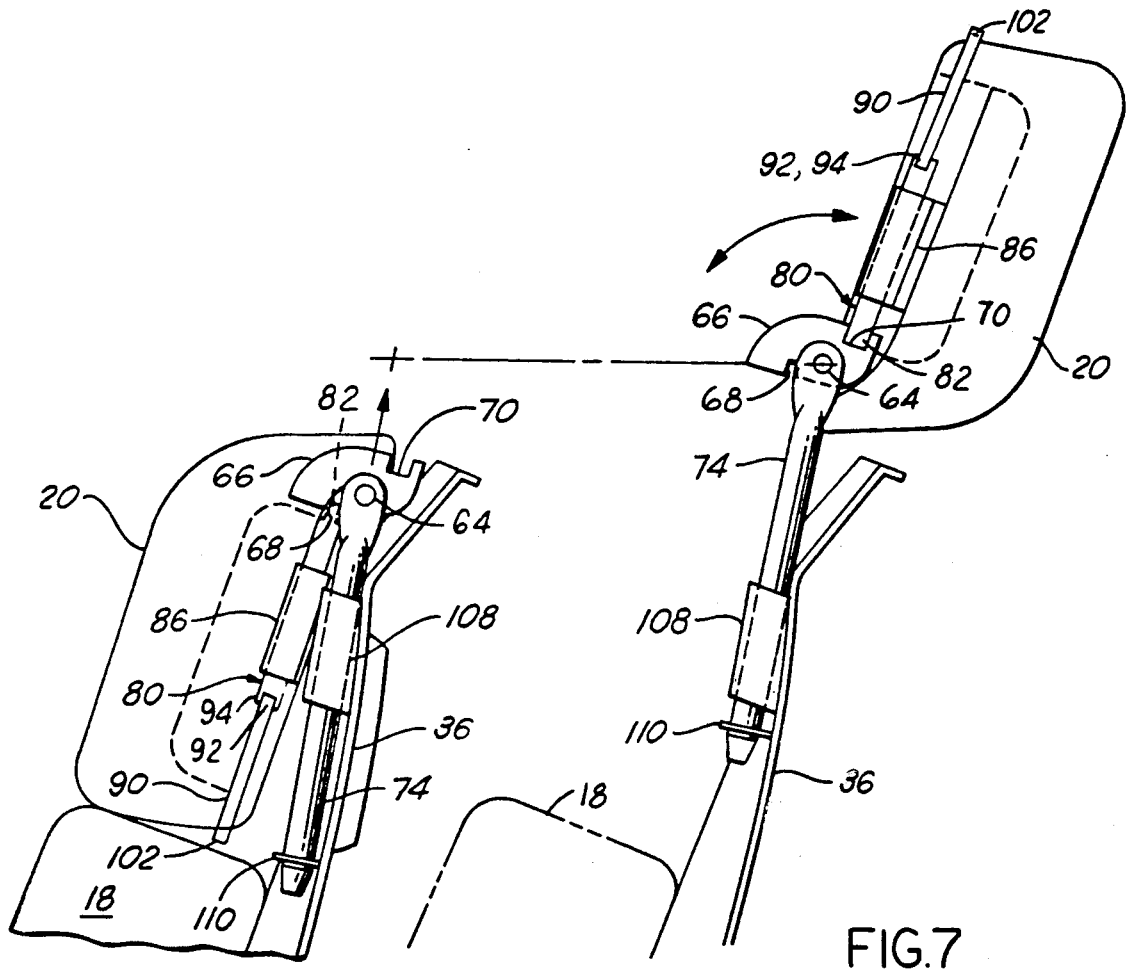

INTEGRAL CHILD SEAT MODULE ADJUSTABLE HEAD SUPPORT LATCH

TECHNICAL FIELD

This invention relates generally to latches and, more specifically, to a height adjustment mechanism for the head support of an automotive integral child seat module.

BACKGROUND ART

Heretofore, various latching and/or hinging arrangements have been utilized for built-in type child seats. Such arrangements have included pivotal rack members for adjusting the slant of the child's seat once released from top edge restraining hooks, as disclosed in Wyttenback U.S. Pat. No. 4,533,176.

Other arrangements include a pivotal member bearing side semi-circular apertures and cooperating seat projecting parts moving from one end of the apertures to the other when the seat is lowered by releasing a spring loaded locking pin, as disclosed in U.S. Pat. No. 3,951,450.

Bailey U.S. Pat. No. 4,690,455 includes a pull strap at the top edge of an integral child seat support which, when pulled out of the bench seat back, rotates on a piano hinge located at the bottom of the seat support.

Casale U.S. Pat. No. 4,664,443 discloses an adult head rest which is mounted on two pivotally mounted levers which are adaptable to being pivotted downwardly into a horizontal position so as to serve as a front restraint for a child seat.

Burleigh U.S. Pat. No. 4,854,639 discloses a child seat head rest which is vertically adjustable by virtue of two slide bars extending downwardly therefrom into frictional engagement with respective bushes.

DISCLOSURE OF THE INVENTION

A general object of the invention is to provide an improved, efficient, safe, and readily usable latching and height adjustment arrangement for a child seat head rest which is stored as an integral part of an adult bench seat backrest in an automotive vehicle.

Another object of the invention is to provide an improved latching and height adjustment arrangement for the head rest portion of an integral child seat module, including a combined height adjustment rod and latch cam, and cooperating spring loaded latch operable to cooperate with lower and upper contact surfaces of the cam to secure the head rest in each of its stored and use positions.

A further object of the invention is to provide an improved latching and height adjustment arrangement for child head rest components which are hidden in an automobile bench seat.

Still another object of the invention is to provide a latch and height adjustment arrangement for a head support of an integral child seat module, and including a support block secured to the back panel, a vertical opening formed through the support block, and a height adjustment rod frictionally and slidably mounted through the vertical opening, a latch cam secured to the upper end of the height adjustment rod and having the lower contact surface when the head support is in its down position for adult use, the spring urging the finger into engagement with the lower and upper contact surfaces formed thereon, and released therefrom by manual actuation of the release means once the head support is manually lifted, pulling the height adjustment rod upwardly through the support block, whereupon the head support is adapted to being rotated so as to rest upon the top of the back panel for child use and secured there upon release of the release means permitting the finger to engage the upper contact surface.

These and other objects and advantages of the invention will become more apparent when reference is made to the following drawings and accompanying description.

BRIEF DESCRIPTION OF THE DRAWINGS

FIG. 1 is a perspective view of a vehicle bench seat embodying the invention;

FIG. 2 is an enlarged fragmentary perspective view of a portion of the FIG. 1 structure in one operational position;

FIG. 3 is an enlarged fragmentary view of a portion of a child seat module embodying the invention;

FIG. 4 is a perspective view of the child seat module illustrating as an exploded view portion thereof a latch and height adjustment mechanism embodying the invention;

FIG. 5 is an enlarged cross-sectional view of a portion of the FIG. 4 structure;

FIG. 6 is a fragmentary side elevational view of the child seat module head support embodying the invention in one operational position; and FIG. 7 is a fragmentary side elevational view of the child seat module head support embodying the invention in a different operational position from that of FIG. 6.

BEST MODE OF CARRYING OUT THE INVENTION

Referring now to the drawings in greater detail, FIG. 1 illustrates an automobile bench seat structure 10 having a seat cushion 12 and a backrest 14. The backrest 14 has an integral child seat module 16 incorporated therein. The module 16 includes a fold-down seat cushion 18 as a lower portion thereof, and a fold-up head support 20 as an upper segment thereof. As illustrated in FIG. 2, when fully opened, there is exposed a cushion and back pad 22 connected together by a flexible hinge 24. A plastic seat support pan 26 is secured to the back surface of the seat cushion 18, to define the upper surface upon which the pad 22 rests when the seat cushion 18 is folded down. A twin shoulder belt 28 and crotch belt 30 assembly, extending through back and seat openings 32 and 34, respectively, is shown in its child use position.

As may be noted in FIG. 3, wherein the cushion and back pad 24 has been removed, the integral child seat module 16 also includes a back panel 36. An adjustable head support latch assembly 38 is operatively connected between the back panel 36 an the head support 20 at each side thereof.

Referring now to exploded FIG. 4, the head support 20 is seen to include a hollow box-like rear portion 40, having side 42 and being a predetermined amount narrower than the front portion of the head support 20. Mounted inside the hollow portion 40 are a pair of oppositely disposed backing plates 44 connected by a panel 46. Each head support latch assembly 38 includes a mounting bracket 50 secured by suitable fasteners 52 through aligned openings 54 in the bracket 50, openings 56 in each respective side 42 to aligned openings 58 in the adjacent backing plate 44. The upper end portion 60 of the bracket member 50 is formed to bend toward the rear of the rear portion 40. An opening 62 is formed through a central location of the bent end portion 60, in axial alignment with an opening 64 formed through a head support latch cam 66. The latter includes a contact surface which may be a cam surface or a notch 68 formed on a lower edge thereof and a notch 70 formed on an oppositely disposed upper edge thereof. The latch cam 66 is mounted between the end portion 60 of the bracket member 50 and a flat end portion 72 of a vertical height adjustment rod 74, and retained therebetween by a pin 76 and its end cap 78. More specifically, the latch cam 66 is secured to the flat end portion 72 by any suitable means, and adapted to have the end portion 60 of the bracket member 50 rotate relative thereto.

A head support latch 80, with a cam follower type finger 82 formed as the end thereof, is slidably mounted in a rectangular opening 84 formed in the upper end of a hollow block member 86. The latter is secured by suitable fasteners 88 to the outer surface of the bracket member 50. An arm 90 extends upwardly from below the bottom edge of the bracket member 50, and is connected at its upper end 92 to the lower end 94 of the latch 80 in any suitable manner. A coil spring 96 (FIG. 5) is mounted around the latch 80 intermediate a bottom support surface 98 of the bloc member 86 and an abutment member 100 formed on the latch 80, urging the latter and its cam follower finger 82 upwardly.

A cross bar 102 extends from the lower end of the rod 90 laterally across the bottom surface of the rear portion 40 of the head support 20 when the latter is in its folded-down adult use position, and serves as a head support release handle. Any suitable covering, such as a flap-like cover 104, may be sed to cover the opening 106 in the hollow box-like rear portion 40. The other end of the cross bar release handle 102 is reciprocally mounted on the other side surface of the rear portion 40 of the head support 20 in a second assembly like the one just described.

A rod support block 108 (FIG. 3) is secured to the back panel 36. The height adjustment rod 74 is frictionally slidably mounted through an opening 110 formed in the support block 108. A rod retainer clip 110 is mounted in an annular groove 112 formed near the lower end of the rod 74.

In operation, the head support 20 may be raised vertically to its fully extended height by manually lifting it, thereby pulling the rod 74 upwardly through the support block 108 wherein it is frictionally retained. At this point, the head support 20 is still in its stored adult position, wherein the finger 82 of the latch 80 is engaged against the cam surface or in the notch 68 of the latch cam 66, preventing the head support 20 from being pivotally raised until the cross bar release handle 102 is pulled downwardly against the force of the spring 96, releasing the finger 82 from the surface or notch 68. This action permits the head support 20 and its attachments to be rotated in a clockwise manner (FIGS. 6), above the top of the back panel 36. Release of the cross bar release handle 102 permits the spring 96 to urge the finger 82 into the upper notch 70, thereby retaining the head support 20 in its uppermost open position. Lifting the handle 102 thereafter permits the head support 20 to be pivoted i a counterclockwise movement (FIG. 7) back to its stored position, ready once again for slidably lowering the rod 74 downwardly through the block 108, ready for adult use.

INDUSTRIAL APPLICABILITY

It should be apparent that the invention provides an efficient, safe, and readily usable adjustable upper latch mechanism for a child head rest which is stored as an integral part of an adult bench seat type backrest in an automotive vehicle.

While but one general embodiment of the adjustable head support latch mechanism has been shown and described, other modifications thereof are possible within the scope of the following claims.

We claim:

1. For use with a child seat module forming an integral part of an automotive bench seat back on a back panel and having a head support positioned on said back panel, a bracket secured to a side edge of said head support, a hollow block member secured to said bracket, latch means slidably mounted in said hollow block member and having a finger extending outwardly therefrom, a spring mounted within said hollow block member for urging said latch means outwardly, release means operatively connected to said latch means, the improvement comprising a support block secured to said back panel, a vertical opening formed through said support block, and a height adjustment rod frictionally and slidably mounted through said vertical opening, a latch cam secured to the upper end of said height adjustment rod and having lower and upper contact surfaces formed thereon, said spring urging said finger into engagement with said lower contact surface when said head support is in its down position for adult use and released therefrom by manual actuation of said release means once said head support is manually lifted, pulling said height adjustment rod upwardly through said support block, whereupon the head support is adapted to being rotated so as to rest upon the top of said back panel for child use and secured there upon release of said release means permitting said finger to engage said upper contact surface.

2. The improvement described in claim 1, wherein said lower contact surface is a predetermined cam surface.

3. The improvement described in claim 1, wherein said lower contact surface is a first notch.

4. The improvement described in claim 1, wherein said upper contact surface is a second notch.

5. The improvement described in claim 1, and a retainer clip secured adjacent eh bottom end of said height adjustment rod.

6. The improvement described in claim 1, and a backing plate mounted inside said head support for securing said bracket thereto through said side edge of said head support.

7. For sue with a child seat module forming an integral part of an automobile bench seat back on a back panel and having a head support positioned on said back panel, and including the following on each side of said head support: a bracket secured to a side edge of said head support, a hollow block member secured to said bracket, latch means slidably mounted in said hollow block member and having a finger extending outwardly therefrom, a spring mounted within said hollow block member for urging said latch means outwardly, release means operatively connected to said latch means, the improvement comprising a support block secured to said back panel, a vertical opening formed through said support block, and a height adjustment rod frictionally and slidably mounted through said vertical opening, a latch cam secured to the upper end of said height adjustment rod and having lower and upper contact surfaces formed thereon, said spring urging said finger into engagement with said lower contact surface when said head support is in its down position for adult use, and released therefrom by manual actuation of said release means once said head support is manually lifted, pulling said height adjustment rod upwardly through said support block, whereupon the head support is adapted to being rotated so as to rest upon the top of said back panel for child use and secured there upon release of said release means permitting said finger to engage said upper contact surface.

* * * * *